Patented Dec. 10, 1940

2,224,174

UNITED STATES PATENT OFFICE 2,224,174

PROCESS OF PURIFYING CO-CARBOXYLASE

John Weijlard, Rahway, N. J., assignor to Merck & Co. Inc., Rahway, N. J., a corporation of New Jersey No Drawing. Application June 23, 1938, Serial No. 215,513

11 Claims. (Cl. 260—251)

This invention relates to a process of isolating pure synthetic co-carboxylase from the mixture of various substances in crude synthetic co-carboxylase, for example that made by the process described by Tauber, J. A. C. S., vol. 60, No. 3, p. 730, March 1938.

Crude synthetic co-carboxylase contains large amounts of unreacted vitamin $B_1$ and other impurities. It is almost impossible to substantially free the crude material from these impurities by the usual methods of fractional crystallization. Hitherto it has not been possible to produce synthetic co-carboxylase of 100% purity, and some doubt may have existed as to whether the synthetic product was identical with the natural co-carboxylase.

I have discovered a method by which co-carboxylase can be separated from vitamin $B_1$ and other impurities, and have been able to produce synthetic co-carboxylase identical with the natural product.

The mixture obtained by the synthetic processes is converted into fractions of silver salts at various hydrogen ion concentrations. By experimentation I have found that at a pH of 4 or less, there is no co-carboxylase precipitated as its silver salt, whereas the silver halide and other silver salts of strong mineral acids are precipitated. On increasing the pH, the silver salt of co-carboxylase starts to precipitate. Precipitation of the silver salt of co-carboxylase occurs up to a pH of about 7, without precipitation of the silver salt of vitamin $B_1$. The fraction containing the silver salt of co-carboxylase is treated with hydrogen sulfide or hydrogen halide in an aqueous suspension, in order to free it from silver, and the thus liberated co-carboxylase is then isolated, for example by concentrating the acid aqueous solution in vacuo, or precipitation with phosphotungstic acid.

The following example illustrates one method of carrying out my invention, but such example is given by way of illustration, and not of limitation.

1½ g. of impure synthetic co-carboxylase, prepared according to the said Tauber process, are dissolved in 150 cc. of water, the solution is made neutral to Congo red (pH 4.0) with an alkali, such as ammonium hydroxide, and about 3 cc. of N silver nitrate, constituting a moderate excess over the quantity required, is added thereto. The mass is centrifuged, the first insoluble fraction being mainly silver chloride.

The solution is made neutral to litmus with ammonium hydroxide, (pH 7.0) and an excess (about 15 cc.) of N silver nitrate is added, whereupon a copious yellow precipitate is produced. The mass is centrifuged and decanted, the precipitate stirred with 50 cc. of water, and again centrifuged. This second or main fraction is the yellow silver salt of co-carboxylase. The decantate is made slightly alkaline to litmus with ammonium hydroxide, N silver nitrate is added, and the mass is centrifuged. A small third fraction of nearly white, insoluble material is obtained, which contains substantially no co-carboxylase. Upon the addition of 3 volumes of methanol to the liquor obtained from the last centrifugation, a fourth fraction of about 0.9 g. of a white insoluble material, consisting mainly of the silver salt of vitamin $B_1$, is obtained.

The second or main fraction containing the silver salt of co-carboxylase is suspended in 150 cc. of water, treated with an excess of hydrogen sulfide, centrifuged and washed with 20 cc. of water. The decantate and washings are aerated to remove any unreacted hydrogen sulfide. The neutral, hydrogen sulfide free solution is mixed with 96 cc. of 2.5 N hydrochloric acid and made up to 300 cc. with water. The resulting solution is 0.8 N with respect to the free mineral acid. A moderate excess of 25% phosphotungstic acid solution is added thereto and the mass is centrifuged. The insoluble residue is treated with 150 cc. of acetone, whereby the co-carboxylase-phosphotungstic compound is split up, the phosphotungstic acid going into solution, while the co-carboxylase precipitates as an oil, which begins to crystallize upon agitation. The mass is centrifuged, the solid material after separation from the acetone solution stirred with 50 cc. of acetone, centrifuged, again stirred with 50 cc. of acetone and centrifuged.

The insoluble residue is treated with 20 cc. N/10 hydrochloric acid, centrifuged, and the decantate passed through a small filter. The insoluble portion is again treated with about 75 cc. of acetone and decanted. The insoluble residue is treated with 10 cc. of N/10 hydrochloric acid and filtered through the same small filter. The filter is washed with 5 cc. of N/10 hydrochloric acid.

The total N/10 hydrochloric acid solutions are mixed with 350 cc. of acetone and cooled in the icebox over night. It is then decanted, the insoluble material dissolved in 15 cc. N/10 hydrochloric acid, 150 cc. of acetone are added, and the mass permitted to stand in the icebox for 24 hours. It is again decanted, the crystalline solid dissolved in 10 cc. of N/10 hydrochloric acid, filtered, and washed with 5 cc. of N/10 hydrochloric acid. 30 cc. of absolute alcohol are added thereto, followed by 120 cc. of acetone, and it is placed in the icebox for 24 hours. The opalescent solution is decanted, and the crystals obtained are dried in vacuo over sulfuric acid. A yield of about 0.18 g. of slightly yellowish crystals are obtained, having a melting point of 216° C., and being about 95–98% pure.

| Found | Calculated |
|---|---|
| 30.62% C | 30.08% C |
| 4.20% H | 4.42% H |
| 11.82% N | 11.71% N |
| 12.37% P | 12.96% P |
| 7.95% Cl | 7.40% Cl |

A further recrystallization gives a substantially 100% pure product. For example, 50 mgm. of 95–98% pure crystals are dissolved in 1 cc. of N/10 hydrocloric acid, 3 cc. of alcohol are added, and the mass is chilled. About 32 mgm. of substantially 100% pure crystals are obtained, having a M. P. of 240° C.

| Found | Calculated |
|---|---|
| 30.36% C | 30.08% C |
| 4.24% H | 4.42% H |
| 11.30% N | 11.71% N |
| 12.83% P | 12.96% P |

The biological activity and the vitamin $B_1$ content of the above pure product correspond to that of the pure natural co-carboxylase.

The third fraction mentioned above was treated exactly as the main or second fraction, using ⅓ the amount of solvents and acetone. No precipitate was obtained on adding 10 volumes of acetone to the final N/10 hydrochloric solution, so that this fraction does not contain any appreciable amount of co-carboxylase.

Modifications may be made in carrying out this process without departing from the spirit and scope thereof and I am to be limited only by the appended claims. For example, the initial treatment of the aqueous solution of impure, synthetic co-carboxylase with a soluble silver salt need not be carried out stepwise to obtain four fractions as described above, but said solution may be treated with an excess of a soluble silver salt at pH 7.0, followed by treatment with hydrogen sulfide or hydrochloric acid. The vitamin $B_1$ remaining in solution may be reclaimed by precipitation on the alkaline side, as explained in the example given. Other changes can be made, as will be obvious to those skilled in the art.

I claim:

1. In the process of purifying impure synthetic co-carboxylase containing large amounts of unreacted vitamin $B_1$, the step which comprises treating an aqueous neutral solution of said impure synthetic co-carboxylase with a soluble silver salt.

2. In the process of purifying co-carboxylase, the steps which comprise treating an aqueous solution of impure synthetic co-carboxylase at a pH not greater than 4 with a soluble silver salt, separating the insoluble residue of said treatment from the solution, adjusting the pH of said latter solution to neutral, and treating the latter neutral solution with a soluble silver salt.

3. In the process of purifying co-carboxylase, the steps which comprise treating an aqueous solution of impure synthetic co-carboxylase at a pH not greater than 4 with a soluble silver salt, separating the insoluble residue of said treatment from the solution, adjusting the pH of said latter solution to neutral, treating the neutral solution with a soluble silver salt separating the insoluble residue of said latter treatment from the solution, and treating an aqueous suspension of the said latter insoluble residue with a member selected from the group consisting of hydrochloric acid and hydrogen sulfide.

4. In the process of purifying co-carboxylase, the steps which comprise adjusting the pH of an aqueous solution of impure synthetic co-carboxylase to not greater than 4 with ammonium hydroxide, treating such aqueous solution with silver nitrate, separating the insoluble residue of said latter treatment from the solution, adjusting the pH of said latter solution to neutral with ammonium hydroxide, and treating the latter neutral solution with silver nitrate.

5. In the process of purifying co-carboxylase, the steps which comprise adjusting the pH of an aqueous solution of impure synthetic co-carboxylase to not greater than 4 with ammonium hydroxide, treating such aqueous solution with silver nitrate, separating the insoluble residue of said latter treatment from the solution, adjusting the pH of said latter solution to neutral with ammonium hydroxide, treating the latter neutral solution with silver nitrate, separating the insoluble residue of said latter treatment from the solution, and treating an aqueous suspension of said latter insoluble residue with a member selected from the group consisting of hydrochloric acid and hydrogen sulfide.

6. In the process of purifying co-carboxylase, the steps which comprise treating an aqueous solution of impure synthetic co-carboxylase with silver nitrate at a pH not greater than 4, separating the insoluble residue of said treatment from the solution, adjusting the pH of said latter solution to neutral, treating the latter neutral solution with silver nitrate, separating the insoluble residue of said latter treatment from the solution, treating an aqueous suspension of the said latter insoluble residue with hydrogen sulfide, separating the insoluble residue of the hydrogen sulfide treatment from the solution, and recovering the co-carboxylase.

7. The process of purifying co-carboxylase comprising treating an aqueous suspension of the silver salt of impure synthetic co-carboxylase with hydrochloric acid, and recovering the co-carboxylase.

8. The process of purifying co-carboxylase comprising treating an aqueous suspension of the silver salt of impure synthetic co-carboxylase with a member selected from the group consisting of hydrochloric acid and hydrogen sulfide, dissolving the co-carboxylase formed in a hydrohalic acid, and crystallizing the co-carboxylase by means of acetone.

9. The process of purifying co-carboxylase comprising treating an aqueous suspension of the silver salt of impure synthetic co-carboxylase with hydrogen sulfide, dissolving the co-carboxylase formed in a hydrohalic acid, and crystallizing the co-carboxylase by means of acetone.

10. The process of purifying co-carboxylase comprising treating an aqueous suspension of the silver salt of impure synthetic co-carboxylase with sufficient hydrochloric acid to dissolve the co-carboxylase formed, and crystallizing the co-carboxylase by means of acetone.

11. The process of purifying co-carboxylase comprising adjusting the pH of an aqueous solution of impure synthetic co-carboxylase to not greater than 4 with ammonium hydroxide, treating the aqueous solution with silver nitrate, separating the insoluble residue of said treatment from the solution, adjusting the pH of said latter solution to neutral with ammonium hydroxide, treating said latter neutral solution with silver nitrate, separating the insoluble residue of said latter treatment from the solution, treating an aqueous suspension of said latter insoluble residue with hydrogen sulfide, removing the latter insoluble residue of the hydrogen sulfide treatment from the solution, treating said last mentioned solution with phosphotungstic acid, treating the insoluble residue of the phosphotungstic acid treatment with acetone, and repeatedly dissolving and crystallizing the insoluble residue of the acetone treatment with hydrochloric acid and acetone.

JOHN WEIJLARD.